(No Model.) 2 Sheets—Sheet 2.
W. WERNER.
MACHINE FOR CUTTING BARS OR GIRDERS.
No. 601,606. Patented Mar. 29, 1898.
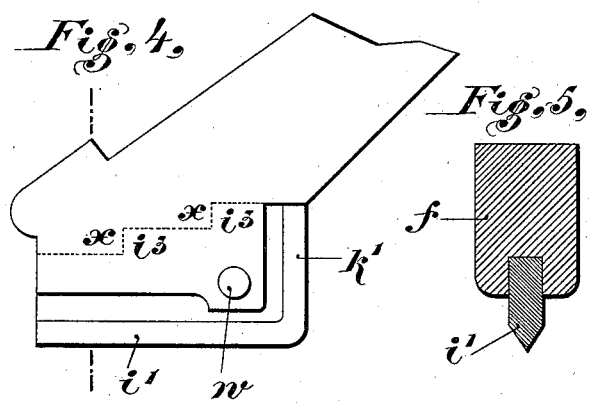
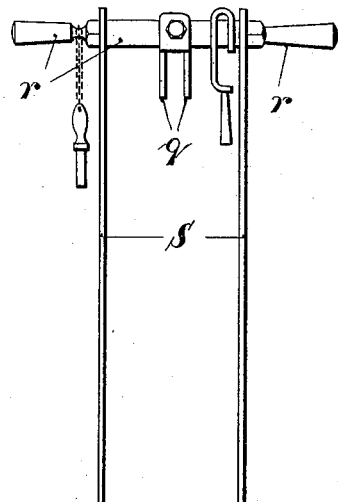
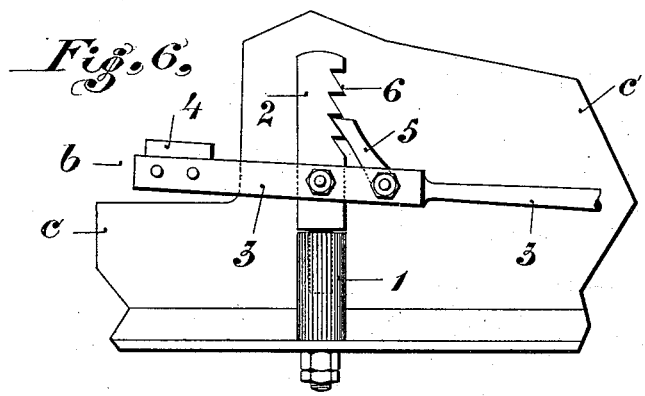
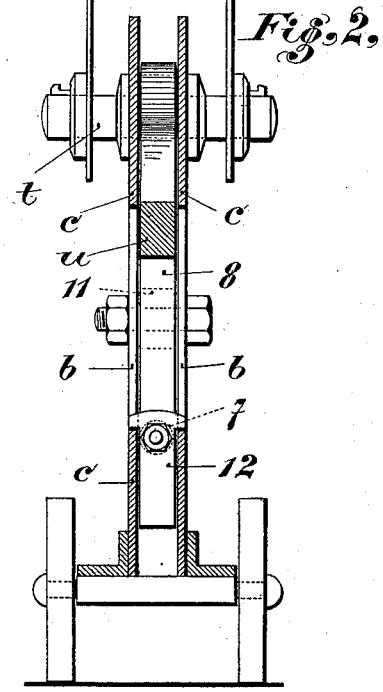
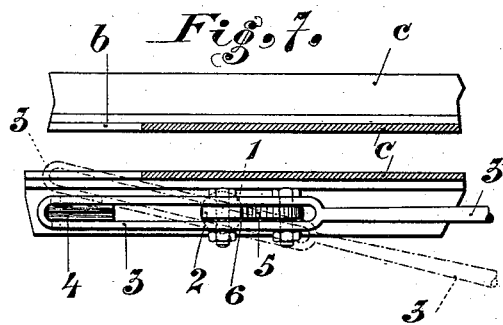

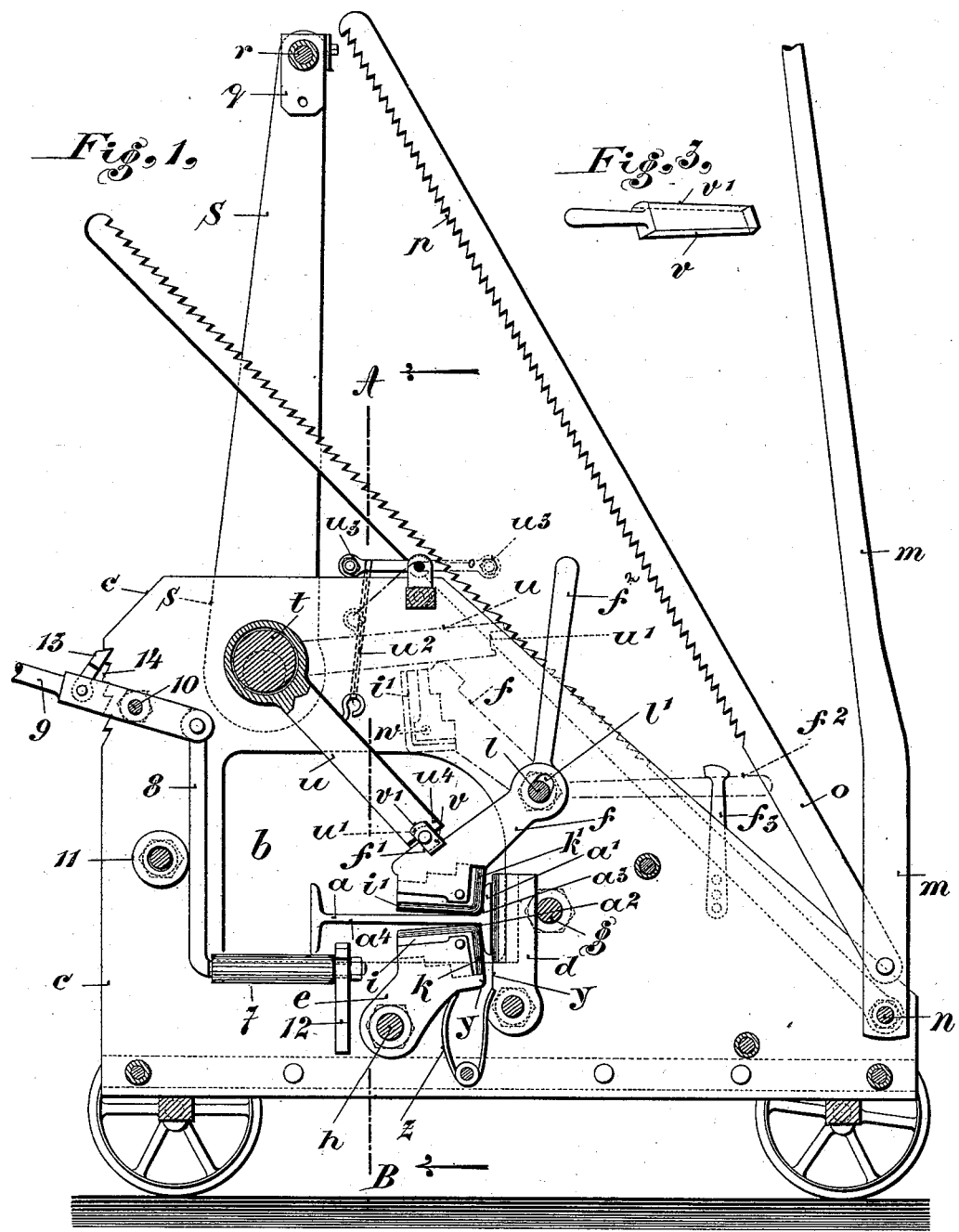

UNITED STATES PATENT OFFICE.

WILHELM WERNER, OF ERFURT, GERMANY, ASSIGNOR TO HUGO JOHN, OF SAME PLACE.

MACHINE FOR CUTTING BARS OR GIRDERS.

SPECIFICATION forming part of Letters Patent No. 601,606, dated March 29, 1898.

Application filed August 16, 1897. Serial No. 648,446. (No model.)

*To all whom it may concern:*

Be it known that I, WILHELM WERNER, gentleman, a subject of the King of Prussia, Emperor of Germany, residing at Erfurt, in the Kingdom of Prussia and German Empire, have invented new and useful Improvements in Machines for Cutting I, U, L, and Like Bars or Grinders, of which the following is a specification.

My invention relates to machinery for cutting bars or girders (hereinafter called "girders") of various cross-sectional forms. I will describe it in connection with girders of I or double-T form, from which its use for cutting girders of other sections will be readily understood. The girder is turned over onto one of its sides and bears on a lower knife, an upper knife only being moved for the purpose of cutting through the girder, receiving pressure in such a direction that in combination with the lower rotatable cutting-tool it presses the flange of the double-T girder against an upright stationary third knife and thereby causes the flange to be cut through by the stationary vertical knife, whereupon the upper knife and the lower knife by reason of the peculiar form of their cutting-surfaces also cut into the web of the girder. In this manner the work of cutting the girder is divided, first, into cutting through an upright flange by means of the three knives arranged on both sides of the said flange and then cutting through the horizontally-situated girder-web. This causes a great saving of power.

Figure 1 of the accompanying drawings is a vertical section illustrating the machine. Fig. 2 is a section through the machine on the line A B, Fig. 1, looking in the direction of the arrows. Fig. 3 illustrates a wedge that is inserted between the pressing-punch and the upper knife. Figs. 4 and 5 are respectively an elevation and a section of a knife, such as the upper knife, with removable cutting edge. Figs. 6 and 7 illustrate a device arranged on the girder-cutting machine for moving the girder to be cut.

The frame of the machine consists of two parallel plates $c\ c$, which are rigidly bolted together and are preferably supported on wheels, as shown. The plates are apertured, as at $b$, and in said aperture the girder $a$ to be cut is arranged horizontally upon its side to be acted upon by the knives $d\ e\ f$.

$d$ is the stationary vertical knife, which bears with its back against the bolt $g$ (that connects the walls of the framing) and is pressed against the broad surfaces of the vertical flange $a'$ of the girder $a$.

The lower knife $e$, upon which the girder lies, is pivoted on a bolt $h$ and has an angular cutting edge $i\ k$ of such a shape that said cutting edge enters first only in the arch $a^2$ between the web and the flange, so that therefore the cutting edge does not act with its whole surface against the lower edge of the web.

The upper knife $f$ is the only knife which is pressed against the girder by means of suitable power-exerting mechanism. It also has two acute-angled cutting edges $i'\ k'$ like the lower knife and is moved in the following manner in order to make a cut:

Pivoted to the hand-lever $m$ near its pivot $n$ is a connecting-rod $o$, which by means of its ratchet-teeth $p$ and a cap $q$ (which is pivoted on the bolt $r$ of the outer end of a lever $s$) rotates the lever $s$ gradually. Upon the rotary axle of the lever $s$ is fixed an eccentric $t$, on which is sleeved an arm $u$, which presses through the medium of an inserted wedge $v$ against the back of the upper knife $f$. The wedge $v$ is held in its position by means of a shoulder $f'$ on the upper knife and is arched at its back $v'$. Against this arch the punch $u$ bears with a corresponding recess $u'$.

By the pressure which is exerted by the eccentric (during the gradual oscillation of the hand-lever $m$ and of the lever $s$, which is moved thereby through the medium of the rod $o$) upon the knife $f$ this knife is forced into the cavity $a^3$ of the girder to be cut and acts first against the inner side of the flange and then against the web of the girder to be cut.

The mode of operation of the cutting machine is as follows: For the purpose of cutting through a girder the said girder is placed upon the knife $e$, so that it is situated in the angle between the edges $i$ and $k$ and bears upon the knife $e$. In order to facilitate the insertion of the girder, there is provided between the stationary vertical knife $d$ and the lower knife $e$ a spring $z$, which forces the knife $e$ away from the knife $d$ and thus has a tendency to widen the space between the two knives. When the girder has been inserted, the wedge $v$ is inserted between the arm $u$ and the upper knife $f$, and then by moving the hand-lever $m$ the eccentric $t$ is gradually rotated. In this manner pressure is exerted upon the back of the knife $f$ in such a direction that the cutting edge $k'$ of the same first enters the inside of the flange at $a^3$ and gradually cuts through the flange on the inside. By this means the girder is further pressed against the fixed knife $d$, so that its cutting edge cuts from the outside into the vertical flange $a'$ of the girder; also, the pressure of the arm $u$ against the upper knife $f$ acts to press the girder $a$ against the lower knife $e$, so that this latter cuts from below into the flange of the girder.

The cutting of the knives $e$, $f$, and $d$ into the girder and the small movement of said knives have for result that the horizontal cutting edges $i$ $i'$ of the knives $e$ $f$ also gradually enter the web $a^4$ of the girder and cut through the latter. When the flange $a'$ and the web $a^4$ have been cut through, the girder is turned, and the cutting operation is effected on the other side of the girder, assuming the case of a double-T girder.

The knife $f$ is loose and is guided in a slot $l'$ in a bolt $l$. This bolt does not serve to guide the knife in the downward movement caused by the arm $u$, (because the knife is then freely movable in its slot $l'$ about the bolt,) but it serves after the completion of the cut to hold the knife $f$ and to allow of it turning up.

In order after the completion of the cut to render the working opening free for the purpose of inserting a fresh girder, the arm $u$ is connected by means of a chain $u^2$ to a small pivoted handle $u^3$, so that by rotating the handle $u^3$ into the position shown in dotted lines the punch $u$ is drawn up. The knife $f$ is then capable of being turned around $l$ by means of a handle $f^2$ and can be turned up by means of said handle, (see dotted position shown in Fig. 1,) so as to leave the working opening free.

A laterally-pivoted leaf-spring $f^3$ serves to hold the handle $f^2$ of the knife $f$, and consequently the latter, firmly. In order to insure good guidance of the arm $u$ on the wedge $v'$, the arm $u$ is provided with an extended nose $u^4$.

In order to relieve the separately-formed cutting edges $i$ $k$ and $i'$ $k'$ in the knife-holder of load, so that a simple attachment by means of a screw $w$ is sufficient to fasten the knife, the knife-edges themselves are provided, as shown in Fig. 4, with steps $i^3$, which steps $i^3$ bear against shoulders on the corresponding knife-holder. A screw $w$ is then sufficient to hold the knife in its place, and the pressure exerted against the cutting edges is taken up directly by the steps $x$.

In order in such cutting-machine to facilitate as much as possible the transport of the girder to the knives, the following means are employed: Adjacent to the front wall of the framing $c$ there is arranged in a sleeve 1 a pin 2, which is capable of rotating in a horizontal sense and on which a hand-lever 3 is mounted so as to be capable of oscillation. This hand-lever 3 is provided on its front end with a knife-edge 4 and at its rear end with a pawl 5, which engages in the teeth 6 of the pin 2. The knife-edge 4 allows the girder to be turned, while the pin 2, mounted rotatably in the sleeve, allows the hand-lever 3 to be moved horizontally, so that by raising and rotating the hand-lever 3 and also by releasing the same the girder can be placed upon the lower knife, and the girder itself can be moved to the exact position. The other end of the girder, which is not to be cut through, rests upon a roller 7, which is pivoted to an arm 8, that can be raised by means of a hand-lever 9, pivoted on a bolt 10. The arm 8, roller 7, and lever 9 are arranged between the two walls of the framing $c$. The arm 8 bears against a roller 11, and the free end of the roller 7 is guided by means of a flat strip of iron 12 between the walls of the framing. The hand-lever 9 is provided at its rear end with a pawl 13, which is adapted to engage with ratchet-teeth 14 on the rear of the walls of the framing $c$. By moving the hand-lever 9 downward the girder $a$ can be raised by the ascending roller 7 and can be moved forward in combination with the transporting apparatus 3 4.

In order to prevent the knives from cutting too deeply, which might cause them to meet at their edges, the knives are formed with shoulders $y$ $y$, which meet when the cutting stroke of the knife is completed.

Having now particularly described and ascertained the nature of the said invention and in what manner the same is to be performed, I declare that what I claim is—

1. In a machine for cutting girders, the combination with the vertical stationary knife $d$, of the upper movable knife $f$ arranged in front of the stationary knife, the pivoted lower knife $e$ arranged beneath the upper movable knife and adapted to be moved away from the stationary knife for the insertion of the girder, a spring $z$ for moving the lower knife away from the stationary knife, and means for actuating the upper movable knife, substantially as described.

2. In a machine for cutting girders, the combination of the vertical stationary knife $d$, the pivoted lower knife $e$, the upper movable knife $f$ having handle $f^2$ and pivot $l$, an eccentric $t$ carried by lever mechanism, and the arm $u$ sleeved on said eccentric and actuated thereby to exert a pressure against the back of the upper movable knife, substantially as described.

3. In a machine for cutting girders, the combination with the stationary knife $d$, of the lower knife $e$ arranged in front of the stationary knife, the upper movable knife $f$ mounted on a pivot, an eccentric $t$, an arm $u$ sleeved on the eccentric and actuated thereby, a removable wedge interposed between the end of said arm and the back of the movable knife, a lever and chain for elevating the arm $u$, a handle $f^2$ fixed on the knife $f$ for raising the latter about its pivot, and means for holding the handle, substantially as described.

4. In a machine for cutting girders, the combination with the cutting mechanism, of means for moving the girder comprising a lever 3 pivotally connected intermediate its ends to a vertical rotary support and provided at one end with a knife-edge adapted to bear against the under side of the girder, a pawl and rack for holding the lever, a roller arranged to bear against one of the flanges of the girder, and means for raising said roller, substantially as described.

In testimony whereof I have hereunto set my hand in presence of two subscribing witnesses.

WILHELM WERNER.

Witnesses:
 MAX MEYER,
 FRIEDRICH BECK.